US012792339B2

(12) United States Patent
Gupta

(10) Patent No.: US 12,792,339 B2
(45) Date of Patent: Nov. 10, 2026

(54) DYNAMIC FIRMWARE ORCHESTRATION FOR DC-SCM AND LEGACY SERVER SYSTEMS

(71) Applicant: American Megatrends International, LLC, Duluth, GA (US)

(72) Inventor: Chitrak Gupta, Johns Creek, GA (US)

(73) Assignee: AMERICAN MEGATRENDS INTERNATIONAL, LLC, Duluth, GA (US)

( * ) Notice: Subject to any disclaimer, the term of this patent is extended or adjusted under 35 U.S.C. 154(b) by 275 days.

(21) Appl. No.: 18/626,474

(22) Filed: Apr. 4, 2024

(65) Prior Publication Data

US 2025/0315240 A1 Oct. 9, 2025

(51) Int. Cl.
*G06F 8/65* (2018.01)

(52) U.S. Cl.
CPC .................................... *G06F 8/65* (2013.01)

(58) Field of Classification Search
None
See application file for complete search history.

(56) References Cited

U.S. PATENT DOCUMENTS

| | | | | |
|---|---|---|---|---|
| 7,590,835 | B1 * | 9/2009 | Nallagatla | G06F 9/44505 717/169 |
| 10,776,102 | B1 * | 9/2020 | Dsouza | G06F 21/57 |
| 11,385,903 | B2 * | 7/2022 | Xie | G06F 8/654 |
| 12,380,051 | B1 * | 8/2025 | Bhatia | G06F 13/4282 |
| 2006/0259756 | A1 * | 11/2006 | Thompson | G06F 8/65 713/2 |
| 2016/0283221 | A1 * | 9/2016 | Kochar | G06F 8/654 |
| 2017/0300690 | A1 * | 10/2017 | Ladnai | G06F 21/554 |
| 2018/0365423 | A1 * | 12/2018 | Poppe | G05B 19/00 |
| 2021/0303287 | A1 * | 9/2021 | Wiginton | G06F 8/65 |
| 2023/0112734 | A1 * | 4/2023 | Suryanarayana | H04L 9/3247 717/170 |
| 2023/0305833 | A1 * | 9/2023 | Zhang | G06F 9/4812 |
| 2024/0168858 | A1 * | 5/2024 | Kondapi | G06N 5/04 |
| 2024/0192748 | A1 * | 6/2024 | Varma | G06F 1/3231 |
| 2024/0303066 | A1 * | 9/2024 | Chung | G06F 8/65 |
| 2024/0385866 | A1 * | 11/2024 | Peterson | G06F 9/45558 |
| 2025/0045466 | A1 * | 2/2025 | Babu S | G06F 12/1416 |
| 2025/0133092 | A1 * | 4/2025 | Parackal Saby | H04L 63/1416 |
| 2025/0231753 | A1 * | 7/2025 | Gupta | G06F 9/4401 |
| 2025/0245334 | A1 * | 7/2025 | El-Azzami | G06F 21/572 |
| 2025/0245336 | A1 * | 7/2025 | Khatri | G06F 21/572 |

* cited by examiner

*Primary Examiner* — Philip Wang
(74) *Attorney, Agent, or Firm* — Tim Tingkang Xia, ESQ.; TROUTMAN PEPPER LOCKE LLP

(57) ABSTRACT

In an aspect of the disclosure, a method, a computer-readable medium, and an apparatus are provided. The apparatus may be a BMC. The BMC receives a consolidated firmware update image. The consolidated firmware update image contains one or more firmware modules for one or more components of a data center secure control module (DC-SCM). The BMC parses the consolidated firmware update image. The parsing identifies the one or more firmware modules. The BMC selects a set of hardware components to be updated based on the parsing of the consolidated firmware update image. The BMC updates firmware of the selected set of hardware components using the corresponding firmware modules from the consolidated firmware update image.

19 Claims, 7 Drawing Sheets

200

DYNAMIC FIRMWARE ORCHESTRATION FOR DC-SCM AND LEGACY SERVER SYSTEMS

BACKGROUND

Field

The present disclosure relates generally to computer systems, and more particularly, to techniques of updating firmware in a data center modular hardware system via a consolidated firmware build orchestration.

Background

The statements in this section merely provide background information related to the present disclosure and may not constitute prior art.

Considerable developments have been made in the arena of server management. An industry standard called Intelligent Platform Management Interface (IPMI), described in, e.g., "IPMI: Intelligent Platform Management Interface Specification, Second Generation," v. 2.0, Feb. 12, 2004, defines a protocol, requirements and guidelines for implementing a management solution for server-class computer systems. The features provided by the IPMI standard include power management, system event logging, environmental health monitoring using various sensors, watchdog timers, field replaceable unit information, in-band and out of band access to the management controller, SNMP traps, etc.

A component that is normally included in a server-class computer to implement the IPMI standard is known as a Baseboard Management Controller (BMC). A BMC is a specialized microcontroller embedded on the motherboard of the computer, which manages the interface between the system management software and the platform hardware. The BMC generally provides the "intelligence" in the IPMI architecture. The BMC may be considered as an embedded-system device or a service processor. A BMC may require a firmware image to make them operational. "Firmware" is software that is stored in a read-only memory (ROM) (which may be reprogrammable), such as a ROM, programmable read-only memory (PROM), erasable programmable read-only memory (EPROM), electrically erasable programmable read-only memory (EEPROM), etc.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a BMC. The BMC receives a consolidated firmware update image. The consolidated firmware update image contains one or more firmware modules for one or more components of a data center secure control module (DC-SCM). The BMC parses the consolidated firmware update image. The parsing identifies the one or more firmware modules. The BMC selects a set of hardware components to be updated based on the parsing of the consolidated firmware update image. The BMC updates firmware of the selected set of hardware components using the corresponding firmware modules from the consolidated firmware update image.

In another aspect of the disclosure, a method, a computer-readable medium, and an apparatus are provided. The apparatus may be a build orchestrator. The build orchestrator detects a change in a hardware component of a data center secure control module (DC-SCM) in a modular hardware system. The build orchestrator constructs a consolidated firmware update image containing one or more firmware modules for one or more components of the DC-SCM based on the detected change. The build orchestrator deploys the consolidated firmware update image to a baseboard management controller (BMC) of the DC-SCM.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
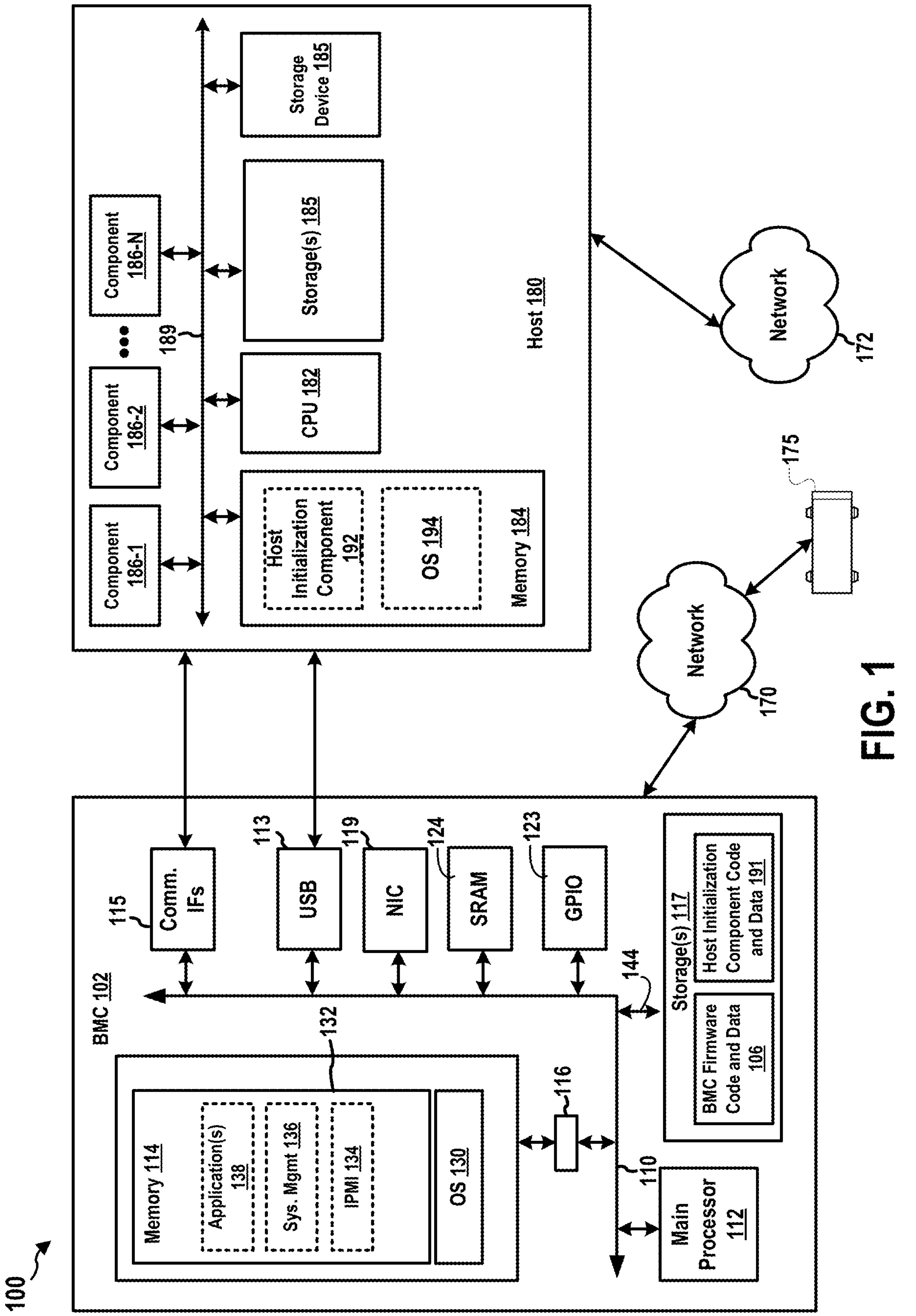
FIG. 1 is a diagram illustrating a computer system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of computer systems will now be presented with reference to various apparatus and methods. These apparatus and methods will be described in the following detailed description and illustrated in the accompanying drawings by various blocks, components, circuits, processes, algorithms, etc. (collectively referred to as elements). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a processing system that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating a computer system 100. In this example, the computer system includes, among other devices, a baseboard management controller (BMC) 102 and a host computer 180. The BMC 102 has, among other components, a main processor 112, a memory 114 (e.g., a dynamic random access memory (DRAM)), a memory driver 116, storage(s) 117, a network interface card 119, a USB interface 113 (i.e., Universal Serial Bus), other communication interfaces 115, a SRAM 124 (i.e., static RAM), and a GPIO interface 123 (i.e., general purpose input/output interface).

The communication interfaces 115 may include a keyboard controller style (KCS), a server management interface chip (SMIC), a block transfer (BT) interface, a system management bus system interface (SSIF), and/or other suitable communication interface(s). Further, as described infra, the BMC 102 supports IPMI and provides an IPMI interface between the BMC 102 and the host computer 180. The IPMI interface may be implemented over one or more of the USB interface 113, the network interface card 119, and the communication interfaces 115.

In certain configurations, one or more of the above components may be implemented as a system-on-a-chip (SoC). For examples, the main processor 112, the memory 114, the memory driver 116, the storage(s) 117, the network interface card 119, the USB interface 113, and/or the communication interfaces 115 may be on the same chip. In addition, the memory 114, the main processor 112, the memory driver 116, the storage(s) 117, the communication interfaces 115, and/or the network interface card 119 may be in communication with each other through a communication channel 110 such as a bus architecture.

The BMC 102 may store BMC firmware code and data 106 in the storage(s) 117. The storage(s) 117 may utilize one or more non-volatile, non-transitory storage media. During a boot-up, the main processor 112 loads the BMC firmware code and data 106 into the memory 114. In particular, the BMC firmware code and data 106 can provide in the memory 114 an BMC OS 130 (i.e., operating system) and service components 132. The service components 132 include, among other components, IPMI services 134, a system management component 136, and application(s) 138. Further, the service components 132 may be implemented as a service stack. As such, the BMC firmware code and data 106 can provide an embedded system to the BMC 102.

The BMC 102 may be in communication with the host computer 180 through the USB interface 113, the network interface card 119, the communication interfaces 115, and/or the IPMI interface, etc.

The host computer 180 includes a host CPU 182, a host memory 184, storage device(s) 185, and component devices 186-1 to 186-N. The component devices 186-1 to 186-N can be any suitable type of hardware components that are installed on the host computer 180, including additional CPUs, memories, and storage devices. As a further example, the component devices 186-1 to 186-N can also include Peripheral Component Interconnect Express (PCIe) devices, a redundant array of independent disks (RAID) controller, and/or a network controller.

Further, the storage(s) 117 may store host initialization component code and data 191 for the host computer 180. After the host computer 180 is powered on, the host CPU 182 loads the initialization component code and data 191 from the storage(s) 117 though the communication interfaces 115 and the communication channel 110. The host initialization component code and data 191 contains an initialization component 192. The host CPU 182 executes the initialization component 192. In one example, the initialization component 192 is a basic input/output system (BIOS). In another example, the initialization component 192 implements a Unified Extensible Firmware Interface (UEFI). UEFI is defined in, for example, "Unified Extensible Firmware Interface Specification Version 2.6, dated January, 2016," which is expressly incorporated by reference herein in their entirety. As such, the initialization component 192 may include one or more UEFI boot services.

The initialization component 192, among other things, performs hardware initialization during the booting process (power-on startup). For example, when the initialization component 192 is a BIOS, the initialization component 192 can perform a Power On System Test, or Power On Self Test, (POST). The POST is used to initialize the standard system components, such as system timers, system DMA (Direct Memory Access) controllers, system memory controllers, system I/O devices and video hardware (which are part of the component devices 186-1 to 186-N). As part of its initialization routine, the POST sets the default values for a table of interrupt vectors. These default values point to standard interrupt handlers in the memory 114 or a ROM. The POST also performs a reliability test to check that the system hardware, such as the memory and system timers, is functioning correctly. After system initialization and diagnostics, the POST surveys the system for firmware located on non-volatile memory on optional hardware cards (adapters) in the system. This is performed by scanning a specific address space for memory having a given signature. If the signature is found, the initialization component 192 then initializes the device on which it is located. When the initialization component 192 includes UEFI boot services, the initialization component 192 may also perform procedures similar to POST.

After the hardware initialization is performed, the initialization component 192 can read a bootstrap loader from a predetermined location from a boot device of the storage device(s) 185, usually a hard disk of the storage device(s) 185, into the host memory 184, and passes control to the bootstrap loader. The bootstrap loader then loads an OS 194 into the host memory 184. If the OS 194 is properly loaded into memory, the bootstrap loader passes control to it. Subsequently, the OS 194 initializes and operates. Further, on certain disk-less, or media-less, workstations, the adapter firmware located on a network interface card re-routes the pointers used to bootstrap the operating system to download the operating system from an attached network.

The service components 132 of the BMC 102 may manage the host computer 180 and is responsible for managing and monitoring the server vitals such as temperature and voltage levels. The service stack can also facilitate administrators to remotely access and manage the host computer 180. In particular, the BMC 102, via the IPMI services 134, may manage the host computer 180 in accordance with IPMI. The service components 132 may receive and send IPMI messages to the host computer 180 through the IPMI interface.

Further, the host computer 180 may be connected to a data network 172. In one example, the host computer 180 may be a computer system in a data center. Through the data network 172, the host computer 180 may exchange data with other computer systems in the data center or exchange data with machines on the Internet.

The BMC 102 may be in communication with a communication network 170 (e.g., a local area network (LAN)). In this example, the BMC 102 may be in communication with the communication network 170 through the network interface card 119. Further, the communication network 170 may be isolated from the data network 172 and may be out-of-band to the data network 172 and out-of-band to the host computer 180. In particular, communications of the BMC 102 through the communication network 170 do not pass through the OS 194 of the host computer 180. In certain configurations, the communication network 170 may not be connected to the Internet. In certain configurations, the communication network 170 may be in communication with the data network 172 and/or the Internet. In addition, through the communication network 170, a remote device 175 may communicate with the BMC 102. For example, the remote device 175 may send IPMI messages to the BMC 102 over the communication network 170. Further, the storage(s) 117 is in communication with the communication channel 110 through a communication link 144.

The server market is currently witnessing a significant transformation due to most Original Equipment Manufacturers (OEMs) and Cloud Service Providers (CSPs) moving towards a modular hardware architecture in their server platforms. Open Compute Project (OCP) details the modularization criteria through its server hardware specifications. The idea behind this approach is to create a hardware ecosystem that is flexible, scalable, and easily upgradable, aligning with the rapid pace of technology advancements in server components.

The Data Center Ready-Modular Hardware System (DC-MHS) specification outlines the essential components of a modular platform. Key to this architecture is the facility it provides for CSPs and OEMs to upgrade existing systems without the need to invest in entirely new server platforms. The components within the servers, such as processors, storage devices, and management controllers, are designed to be replaceable or upgradable as individual units. This approach significantly reduces the Total Cost of Ownership (TCO) for the organizations, as components can be updated or replaced as needed, without a full system overhaul.

One of the primary benefits of adopting the DC-MHS guidelines is the agility it lends to system upgrades. Instead of the lengthy process traditionally involved in replacing or upgrading whole servers, modular components can be slotted in with minimal disruption, greatly accelerating the upgrade lifecycle and ensuring that server platforms can keep pace with evolving workloads and technological advancements.

A DC-MHS includes a Data Center Security and Control Module (DC-SCM). It incorporates essential subsystems such as the Baseboard Management Controller (BMC) stack and the Hardware Root of Trust (ROT).

The DC-SCM is a compact module designed as a daughter card to be integrated onto a server motherboard. The DC-SCM encapsulates several critical management functionalities that are central to the operation and integrity of the server system. The DC-SCM's infrastructure allows it to be easily swapped out or upgraded without the necessitation of replacing the entire server.

The DC-SCM includes a BMC stack. The BMC stack is responsible for the monitorization of the server's hardware state, facilitating remote management capabilities such as power control, system restoration, and logging. The BMC supports the server's lifecycle by providing diagnostic tools, the ability to update firmware, and manage hardware settings even when the server OS is not running. The modularity of BMC within the DC-SCM means that, as server management needs evolve or as new BMC technology gets introduced, the BMC functionality can be updated or replaced independent of other hardware components.

The DC-SCM includes a Hardware Root of Trust (ROT). The ROT is essentially a trusted source of verification for software and firmware loads on the server, establishing a baseline of trust for all operations. It ensures that only signed, verified code is executed on startup to prevent unauthorized firmware from compromising server integrity.

The ROT mechanism functions as the root for all trust chains on the server, and integrating it within the DC-SCM enables a secure boot process.

The DC-MHS further includes a Host Processor Module (HPM). The HPM functions as the 'brain' of the system, hosting processors such as CPUs (Central Processing Units), GPUs (Graphics Processing Units), IPUs (Infrastructure Processing Units), DPUs (Data Processing Units), and accompanying DIMMs (Dual Inline Memory Modules) to provide computing and processing capabilities necessary for running applications and managing workloads.

With the modular approach of DC-MHS, the HPM, including its various processor types and memory, becomes a replaceable unit within the server architecture. Such modularity permits on-the-fly upgrades of the HPM to adapt to new technologies, workloads, or performance goals without the need for comprehensive system replacement. From swapping an outdated CPU to a more powerful one or adding high-capacity DIMMs, the HPM acts as an interchangeable module, facilitating seamless transitions and continuous performance optimization.

The DC-MHS also includes Modular I/O (DC-MIO). The DC-MIO deals with the varied input/output requirements of modern data centers, encapsulating subsystems for storage, network interface cards (NICs), accelerators, and a range of interconnect technologies. These modular components are utilized for a server's connectivity and throughput capabilities to specific workload demands.

The DC-MHS also utilizes SMART Network Interface Cards (NICs) and Data Plane technologies. SMART-NICs are advanced network cards with built-in processors—often based on Field-Programmable Gate Array (FPGA) technology or specific multicore CPUs—that can offload processing tasks from the server's central processing units (CPUs). These network interface cards enable sophisticated processing at the network edge, closer to where data is entering or leaving the server. This form of processing enables efficient data plane operations—those tasks concerned with the forwarding of data packets through the network.

The modular architecture of the DC-MHS improves server upgradeability and system management.

The DC-MHS utilizes modular hardware, enabling easy replacement of components and facilitating easy upgrades. Individual components of the DC-MHS, such as the Host Processor Module (HPM), the DC-SCM, and the Modular I/O, can be interchanged without the requirement of overhauling the entire server infrastructure.

Changes in the HPM can result in the creation of entirely new systems. An HPM upgrade, such as the replacement of a CPU with a more advanced variant, transforms the system's capabilities, aligning it with current performance requisites or specific computational needs.

The modular architecture enables a pay-as-you-go model. This model allows for incremental investments, where CSPs and OEMs can strategically upgrade hardware components based on evolving performance requirements or budget considerations, as opposed to incurring the cost of complete server replacements.

Changes to platform devices necessitate dynamic firmware capabilities, to ensure that upgrades or alterations in hardware are adequately supported by the system's software. An adaptable firmware framework can respond to changes in the HPM or other components, thus maintaining the integrity and functionality of the server's operations. The adaptable firmware framework serves this purpose by dynamically constructing firmware images tailored to the new configuration.

With the advent of a modular design, device and sensor configurations are no longer static but become dynamic entities within the server ecosystem. As components are added, removed, or upgraded, sensor configurations adapt accordingly, ensuring the ongoing accurate monitoring and management of server health and performance parameters.

Further, the DC-SCM enables changes to be made in the management module. Accordingly, the BMC firmware are readily adaptable to support fresh deployments or upgrades.

Figure 2:
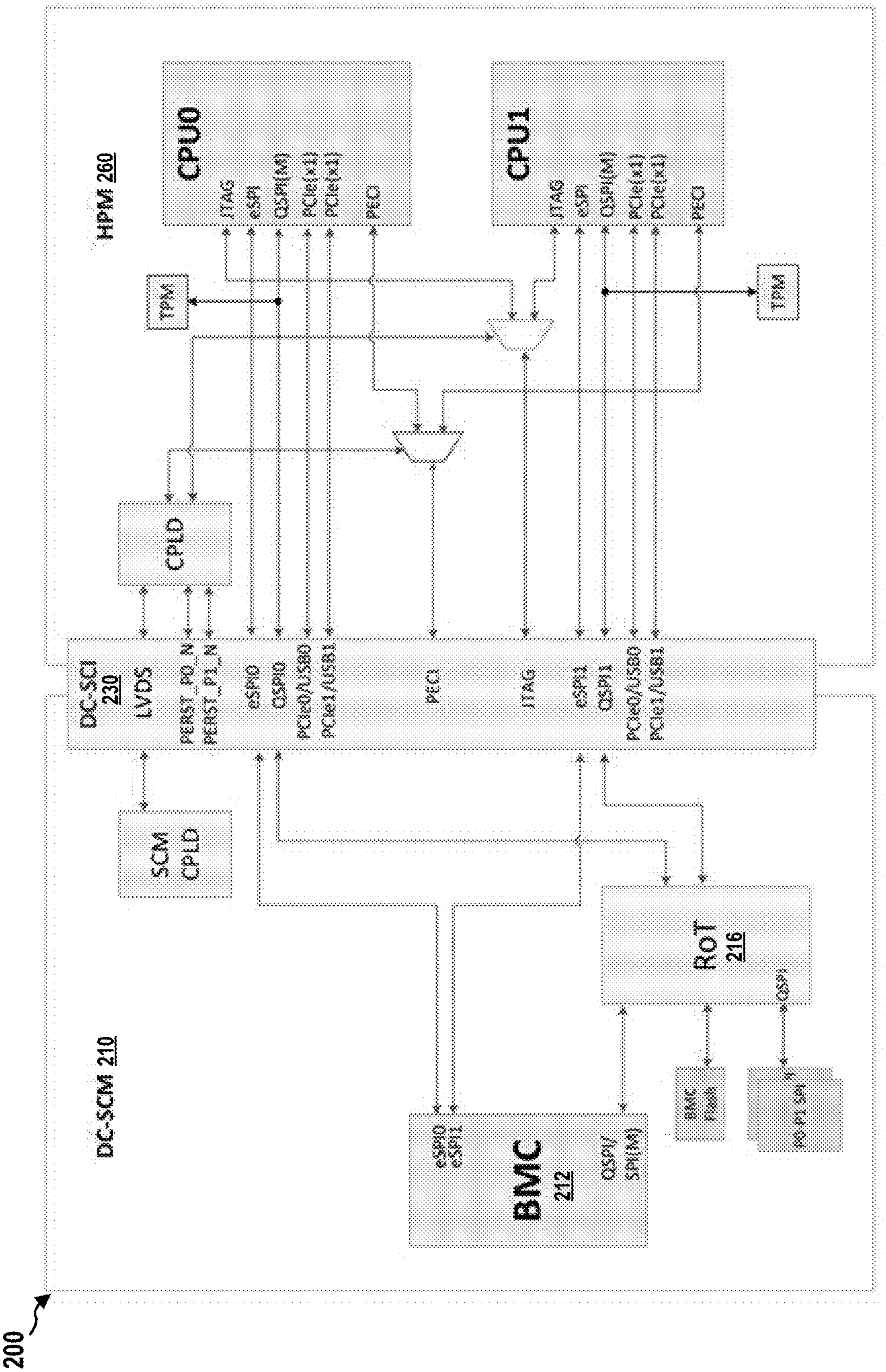
FIG. 2 is a diagram illustrating a modular hardware system.

FIG. 2 is a diagram illustrating a modular hardware system 200. The modular hardware system 200 includes a DC-SCM 210, a HPM 260. The DC-SCM 210 includes a BMC 212 and HROT 216, and a Data Center System Connection Interface (DC-SCI) 230. The HPM 260 includes a CPU0 and a CPU1. The DC-SCM 210 and the HPM 260 are connected via the DC-SCI 230. The DC-SCI 230 serves as the foundational communication backbone connecting the Data Center Security and Control Module (DC-SCM) 210 with the Host Processor Module (HPM) 260. It is equipped with a variety of interfaces and protocols designed to ensure a seamless and efficient data flow between the various server modules.

In the modular hardware system 200, the BMC 212 is part of the DC-SCM 210 and adheres to the specifications of the DC-SCM 210. As a replaceable unit within the DC-SCM 210, the BMC 212 may be transitioned between different BMC System-on-Chip (SOC) components provided by the OEMs and CSPs. Deployable firmware images may be supplied for these BMC modules. That is, the firmware are as interchangeable as the hardware components it manages. For example, the OpenBMC firmware is often used.

The Host Processor Module (HPM) may change in a DC-MHS system. In the example of FIG. 2, the HPM 260 functions as the computing module or "brain" of the modular hardware system 200, hosting processors such as CPUs and GPUs along with memory. If the HPM 260 is upgraded or swapped out, it essentially changes the platform, as a new compute module is introduced. For example, the CPU0 and CPU1 in the existing HPM 260 could be replaced with a newer generation processor. The DC-SCI 230 provides standardized connectivity between the HPM and other modules such as the DC-SCM 210, abstracting low-level interface details. However, the BMC 212 in the DC-SCM 210 still needs awareness of the physical interfaces provided by a new HPM for proper management and monitoring. The BMC 212, residing in the DC-SCM 210, recognizes these changes and interacts appropriately with the new physical interfaces provided by the altered HPM.

The BMC 212 encapsulated in the DC-SCM 210 may also change. As a replaceable daughter card unit, an outdated BMC 212 SOC component may be upgraded to a newer generation BMC SOC with different firmware requirements. Customers utilizing AMI's BMC firmware stack require the flexibility to Tailored BMC firmware images may be built and deployed for any SOC and platform combination that may arise from BMC swaps. That is, the necessary BMC firmware may be generated on-the-fly to accommodate both the SOC and platform configurations. The BMC image should also inherit necessary configurations from the previous BMC while seamlessly supporting the new module.

Device configurations in the modular hardware system 200 are expected to change over time due to hardware lifecycle management involving addition, removal, or upgrades of devices. The BMC firmware has capabilities to dynamically handle such changes in devices and sensors, discovering new devices added and managing them appropriately. The BMC 212 can handle device changes occurring.

The DC-SCI 230, as the primary conduit for communication and interaction among the modular components of the DC-MHS, adheres to a set standard specification. This standardization ensures that, despite the mutable nature of the aforementioned elements (HPM, BMC, and device configurations), the foundational interconnectivity remains consistent and reliable. The DC-SCI 230's role is to provide a stable and secure platform upon which these interchangeable components can operate cohesively.

In the modular hardware system 200 shown in FIG. 2, the DC-SCM 210 and HPM 260 are separate replaceable modules connected via the DC-SCI 230 interface. As discussed, the HPM 260 as the compute module can be swapped out or upgraded, essentially changing the platform. Similarly, the BMC 212 within the DC-SCM 210 is a replaceable daughter card unit that can also be changed to a newer generation BMC SOC.

To handle such mutable components and platforms, the BMC firmware also has portability. The firmware is configurable to support any alterations occurring in modules of the modular hardware system 200 such as the HPM 260 or BMC 212. For example, if the HPM 260 is swapped from one processor to another, the firmware of the BMC 212 can dynamically handle the new physical interfaces and devices presented by the changed HPM module.

Further, if the BMC 212 itself is upgraded to a newer SOC generation with different firmware requirements, the modular approach allows tailored BMC firmware images to be constructed on-the-fly based on both the new SOC and platform combination. A build orchestration system maintains repositories of SOC drivers, bootloaders, porting components etc. that can be pulled in dynamically to generate firmware images compatible with the new configurations. This firmware portability allows the BMC 212 to adapt to changes in the modular hardware system 200.

The BMC firmware architecture is a framework that includes Intellectual Properties (IP) and abstraction layers that cater to various silicon (i.e., processors) providers (e.g., Intel, AMD, NVIDIA, Qualcomm, and ARM). This multi-tiered architecture comprises the following features:

- Silicon Provider IP: This represents the proprietary technology or IP provided by the silicon manufacturers. For example, it includes specific drivers or firmware necessary to interact with CPUs such as CPU0 and CPU1 of the HPM 260.
- CSP IP: Cloud Service Provider (CSP) specific IPs that are tailored to the requirements of service providers managing cloud infrastructure.
- BMC Vendor IP: BMC Vendor contributes its proprietary IP as part of the firmware stack, ensuring integration with its suite of deployment and management tools.
- Application Abstraction (SDK): An SDK (Software Development Kit) layer abstracts the underlying complexity and provides a standardized set of tools for application development.
- Platform Abstraction (PDK): The Platform Development Kit (PDK) encapsulates platform-specific information and abstracts the complexities of hardware interaction. It aids in the discovery, management, and monitoring of devices and sensors connected to the modular server system.
- SOC Abstraction (HAL): A Hardware Abstraction Layer (HAL) that provides SOC-specific interfaces, thus creating a separation between the hardware specifics and the firmware logic.
- OpenBMC: A base framework for BMC firmware development.

These components of the BMC firmware architecture enable the firmware to dynamically handle each unique platform configuration, such as when the BMC 212 interfaces the HPM 260 whose components have been changed.

The SOC Abstractions may be provided within the Yocto build framework. The Yocto build framework is an open source tool for building custom Linux-based systems for embedded and IoT devices. The SOC abstraction layers provided by Yocto enables portability across different BMC SOCs. As part of the firmware architecture, abstractions for the BMC System-on-Chip (SOC) are provided in case the DC-SCM module containing the BMC is changed. The Yocto build framework provides these abstractions through modular metadata layers specific to each SOC.

These meta-<soc> layers contain the recipes, packages, configuration files etc. required to build the BMC firmware image for that particular SOC. For example, the meta-aspeed layer has everything needed to compile the firmware for an Aspeed AST2500 or AST2600 SOC. This includes the Linux kernel, bootloaders, drivers, libs, apps, configs etc. Similarly, there can be a meta-nuvoton layer for Nuvoton NPCM7xx SOCs.

If the hardware changes from Aspeed SOC to Nuvoton, a Build Orchestrator tool will include the meta-nuvoton layer instead of meta-aspeed during image generation. As such, the abstraction layers enable porting the firmware across different BMC SOC hardware with minimal changes to the rest of the firmware stack. When BMC hardware upgrade happens by replacing the BMC 212 with a newer generation BMC System-on-Chip (SOC), a tailored BMC firmware image are loaded promptly on the new module to minimize server downtime.

To enable rapid roll-out of firmware, the Build Orchestrator system maintains repositories of pre-built components such as kernel, bootloaders, configuration files etc. for various BMC SOCs. Specifically, the Yocto meta-layers contain modular recipes to build BMC firmware for a particular SOC. When the BMC 212 SOC is changed, the Build Orchestrator identifies the target hardware and injects the appropriate meta-layer into the build process to generate firmware with relevant kernel, drivers, libs suited to the new BMC chip. Additionally, Platform Configuration Capsules store modular device configurations needed for discovery and sensor management on that specific server platform. By bringing together these hardware-specific modules at build time, the orchestration system can synthesize a customized, production-grade BMC image for deployment on the new DC-SCM BMC card. Thus, the configurable modular architecture enables rapid roll-out of tailored firmware to support hardware upgrades in line with the dynamic nature of modular platforms.

In the modular hardware system 200, the platform configuration for the BMC 212 can be abstracted through modular platform-specific files handled dynamically at runtime. When the system changes due to HPM 260 alterations or other device modifications, corresponding platform-specific files are provided to the BMC 212 firmware to handle the new configuration.

These platform-specific files enabling device discovery, sensor monitoring, event actions etc. are packaged into modules called platform configuration capsules (PCCs). The PCCs may contain one or more of the following:

- Sensor Data Record (SDR) information: Detailing the mappings of sensors to their respective I2C buses within the modular server system, aiding in prescient sensor management.
- Platform event filter configurations: Seizing event messages tailored to specific chips—akin to Intel or any emerging variant—and configuring responsive actions pertinent to such events.
- Vendor platform-specific libraries and configurations, including Entity manager JSON files: Governing the establishment of settings and standards aligned with the AMI intellectual property's requirements.
- Platform-specific static tables, Management Controller Transport Protocol (MCTP) endpoint tables, Platform Level Data Model (PLDM) Platform Descriptor Records (PDRs): Furnishing static references which are instrumental for the identification and communication with different platform components.
- Power and thermal configurations and algorithms: Regulating the server's thermal profile and energy consumption, pivotal for maintaining operational efficiency and integrity within the DC-MHS.

For example, an "archercity" platform will have an archercity.pcc capsule. The PCC files packages are bound to the server platform with unique identifiers. The PCC files packages are accessible for download and integration at runtime from EMMC storage or a deployment cloud, For example, when the HPM 260 changes prompting an image rebuild, the appropriate PCC capsule for the new platform is downloaded by the BMC 212 providing the URL. The BMC 212 notifies the build orchestrator of HPM or device changes, passing the CPU info to build a tailored image.

Thus, platform-specifics are abstracted into modular PCCs handled dynamically allowing portable BMC 212 firmware across hardware changes like HPM swaps. The interconnect DC-SCI 230 remains standard between DC-SCM 210 and mutable modules like HPM 260. This firmware portability supports the flexible hardware upgrades in line with the dynamic modular architecture.

Figure 3A:
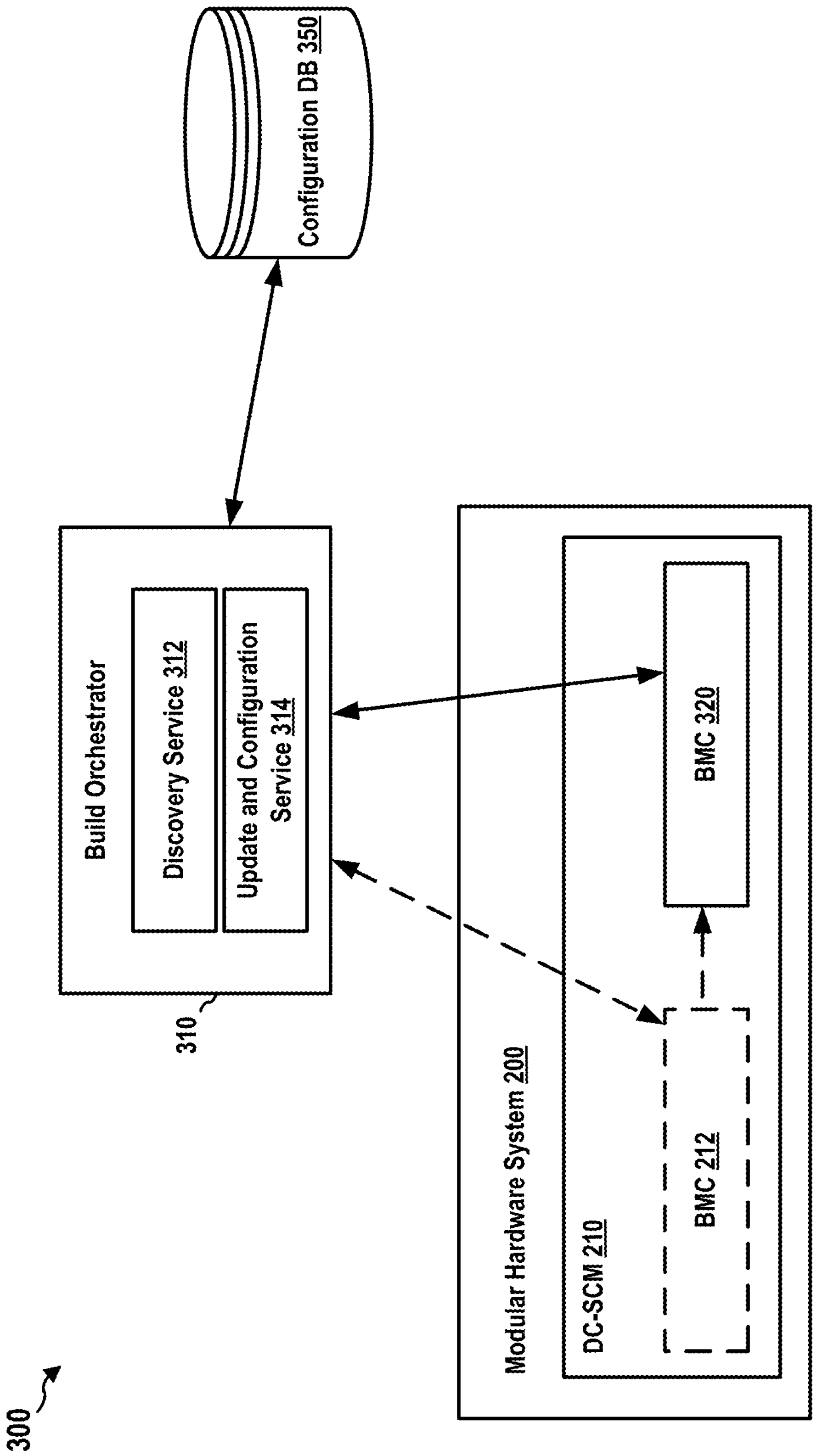
FIG. 3(A) is a diagram illustrating a build orchestrator.

FIG. 3(A) is a diagram 300 illustrating a build orchestrator 310. The build orchestrator 310 includes a discovery service 312 and an update and configuration service 314, and is in communication with a configuration database 350. Each of the build orchestrator 310 and configuration database 350 may be implemented by a computing device having a structure similar to that of the a host computer 180.

The build orchestrator 310 automates the process of constructing firmware images that are tailored to the specific configurations of the the modular hardware system 200's hardware. The build orchestrator 310 may continuously monitor the modular hardware system 200 for any events that signal changes in the hardware configuration. These changes may involve the HPM 260, which includes CPU0 and CPU1, or the BMC 212 embedded within the DC-SCM 210. When such an event is detected, the build orchestrator 310 is responsible for initiating a build process that assembles a new firmware image compatible with the updated hardware setup.

An orchestration process executed by the build orchestrator 310 involves managing a repository of firmware components, which includes drivers, bootloaders, and platform-specific configurations. The build orchestrator 310 uses this repository to put together a firmware image that aligns with the new configuration of the system's hardware.

The build orchestrator 310 may leverage a Yocto-based build framework to compile the necessary components and generate the firmware image. This includes selecting the appropriate Yocto meta-layers that correspond to the System-on-Chip (SOC) used in the BMC 212 or other hardware components that have undergone changes. Once the firmware image is constructed, the build orchestrator 310 oversees its deployment to the BMC 212, which may require the BMC to enter flash mode for the firmware update and subsequently reboot the system to apply the new configuration.

Additionally, the build orchestrator 310 provides an Application Programming Interface (API) that enables the BMC 212 to communicate hardware changes and request the generation of new firmware images. This API facilitates automated interactions between the BMC 212 and the build orchestrator 310, allowing for real-time updates and modifications to the firmware in response to changes within the hardware system.

The build orchestrator 310 maintains the firmware's integrity and compatibility within the modular hardware system 200. The updated firmware remains synchronized with the hardware configuration, whether it pertains to the processors within the HPM 260, the management components within the DC-SCM 210, or the protocols managed by the DC-SCI 230.

In this example, the BMC 212 of the modular hardware system 200 is replaced with a BMC 320 (such as the transition from an Aspeed AST2600 to an AST2700). The build orchestrator 310, with its two primary services—a) the discovery service 312 and b) the update and configuration service 314 manage the firmware to align with this modular approach. The discovery service 312 is responsible for discovering BMCs within the network.

Once a BMC (e.g., initially the BMC 212) is discovered in the network, the discovery service 312 creates a data entry in a configuration database 350. The data entry encompasses details such as platform inventory, BMC SOC type, firmware versions, and generates a JSON configuration file with relevant platform, BMC, and device attributes.

Subsequently, the update and configuration service 314 obtains the device information of the BMC 212 from the configuration database 350. The update and configuration service 314 compares the device configuration of the BMC 212 with the device configuration of the BMC 320 to determine whether any additional changes need to be made to the firmware of the BMC 320.

If a newer version of firmware for the BMC 320 is available, the update and configuration service 314, initiates a new build for the BMC 320 with the platform configuration. Similarly, the build orchestrator 310 may build a new firmware for the entire DC-SCM 210 if any other platform modules within the DC-SCM 210 also have been changed.

Figure 3B:
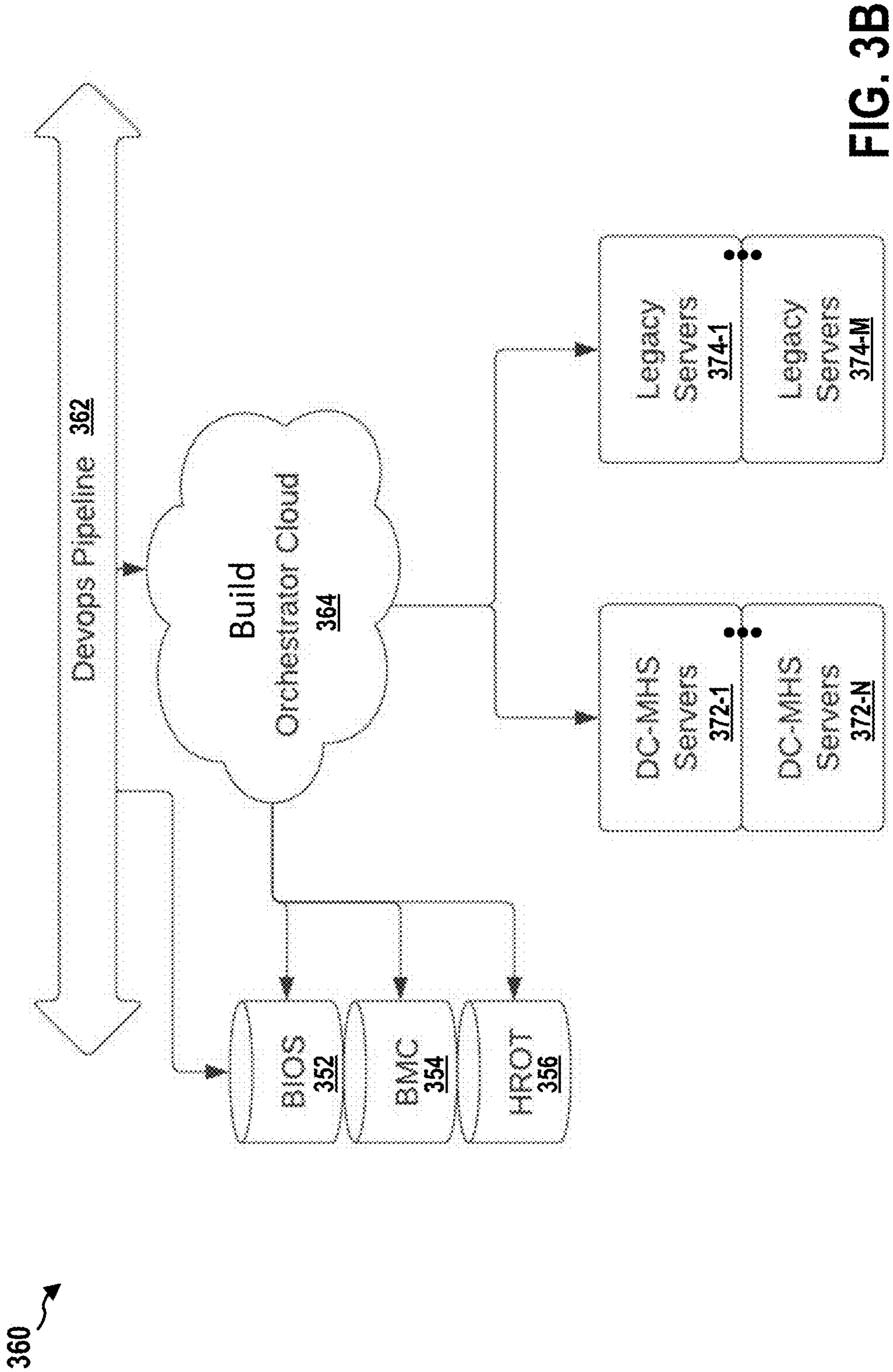
FIG. 3(B) is a diagram illustrating a management setup of a cloud-based firmware management solution.

FIG. 3(B) is a diagram illustrating a management setup 360 of a cloud-based firmware management solution. The management setup 360 includes a development-and-operations (devops) pipeline 362 and a build orchestrator cloud 364. The build orchestrator cloud 364 manages a heterogeneous data center that consists of both DC-MHS servers 372-1 to 372-N and legacy servers 374-1 to 374-M.

New or replacement BMCs, BIOSs, HROTs can be installed on the legacy servers 374-1 to 374-M or the DC-MHS servers 372-1 to 372-N. The devops pipeline 362 creates dynamic firmware modules such as a BIOS firmware module 352, a BMC firmware module 354, and a HROT firmware module 356.

The build orchestrator cloud 364 monitors the DC-MHS servers 372-1 to 372-N and the legacy servers 374-1 to 374-M in the data center. The build orchestrator cloud 364 understands the characteristics of the BMCs, such as the BMC 212 and the BMC 320, in the servers and creates policies of deployment based on that understanding.

For example, the build orchestrator cloud 364 may use the discovery service 312 to discover the BMCs in the servers and collect device information of the BMCs. The build orchestrator cloud 364 may store the device information of the BMCs in the configuration database 350.

When the build orchestrator cloud 364 detects, using the discovery service 312, that a BMC in a server has been replaced, such as the BMC 212 in the modular hardware system 200 has been replaced with the BMC 320, the build orchestrator cloud 364 may use the update and configuration service 314 to initiate a firmware build and configuration update process for the BMC 320.

The devops pipeline 362 creates the dynamic firmware modules for the BIOS firmware module 352, the BMC firmware module 354, and the HROT firmware module 356 that are used by the build orchestrator cloud 364 to build the firmware for a new or replace DC-SCM 210. The build orchestrator cloud 364 may compare the device information of the DC-SCM 210 with the device information stored in the configuration database 350 to determine how to build the firmware for the BMC 320.

As described supra, the modular hardware system 200 is a DC-MHS that utilizes a DC-SCM 210. The DC-SCM 210 includes the BMC 212, the Hardware Root of Trust (HROT) 216, and a BIOS flash. A firmware vendor may provide all firmware components of the DC-SCM 210 and may utilize a cloud-based deployment infrastructure firmware deployments.

Currently, each firmware component (BMC, BIOS, HROT) is a separate firmware deployment. There is no method to dynamically detect the necessity of a consolidated firmware deployment based on the hardware characteristics of the managed systems.

In a DC-MHS, when a full DC-SCM 210 is changed, all the firmware components (BMC, BIOS, HROT) need to be upgraded together. In certain configurations, the build orchestrator 310 may create a consolidated firmware for the DC-SCM 210 controller, rather than separate individual firmware for each module.

The firmware orchestration is done from a build orchestrator 310 running in the build orchestrator cloud 364 or running on an on-premises deployment application. The build orchestrator 310 understands the DC-SCM 210 controller features and firmware requirements, and then creates a consolidated firmware. That is, in a DC-MHS scale, when there is a requirement to change the DC-SCM 210 firmware, the build orchestrator 310 may create one single DC-SCM firmware image, not separate images for BIOS, BMC, or HROT firmware.

The build orchestrator cloud 364 also understands the characteristics of the hardware, whether it is a legacy system (legacy servers 374-1 to 374-M) or a DC-MHS-compliant system (DC-MHS servers 372-1 to 372-N). Based on that, the firmware generated for deployment will be different.

The devops pipeline 362 creates dynamic firmware modules for the BIOS firmware module 352, the BMC firmware module 354, and the HROT firmware module 356. For the the DC-MHS servers 372-1 to 372-N, the build orchestrator 310 uses these modules to build a consolidated firmware image for a new or replaced DC-SCM 210. For the legacy servers 374-1 to 374-M, the build orchestrator 310 generates separate BIOS firmware module 352, BMC firmware module 354, HROT firmware module 356 and deploy them separately.

Figure 4:
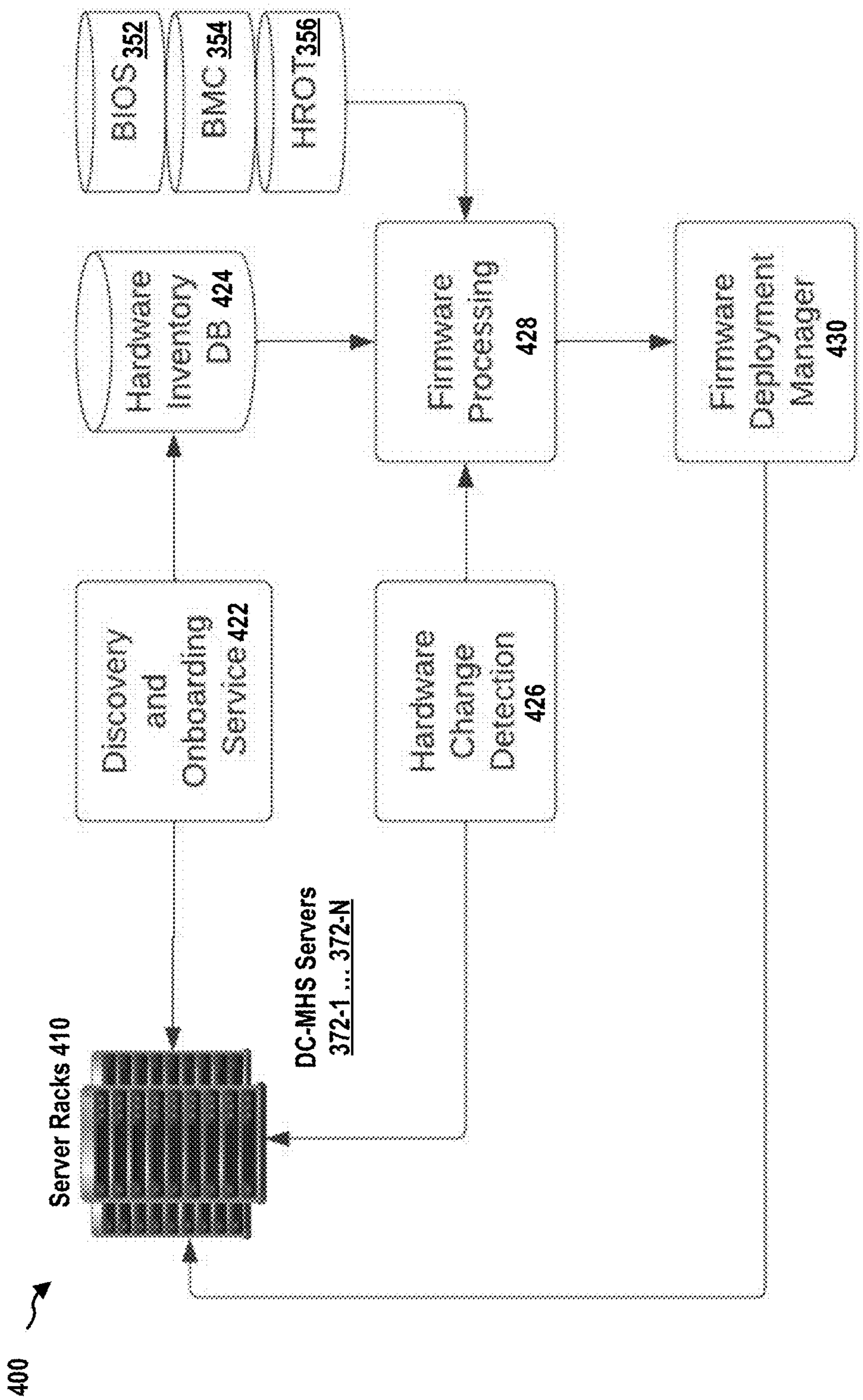
FIG. 4 is a diagram illustrating a build orchestration setup.

FIG. 4 is a diagram 400 illustrating a build orchestration setup. In this example, server racks 410 contains the DC-MHS servers 372-1 to 372-N and the legacy servers 374-1 to 374-M, which are managed by components of the build orchestrator 310. The build orchestrator 310 includes a discovery and onboarding service 422, a hardware change detection component 426, a firmware processing component 428, a firmware deployment manager 430. As described infra, the build orchestrator 310 may create and/or maintain a hardware inventory database 424. Each of these services and components may be implemented by a computing device having a structure similar to that of the a host computer 180. Further, more than one services and/or components may implemented by the same computing device.

The discovery and onboarding service 422 detects the systems in the data center and maintains a hardware inventory database 424. This database maintains a record of all hardware components, including their types, identifiers, and current firmware versions.

The discovery and onboarding service 422 can use REDFISH discovery or IPMI protocols to understand the characteristics of the servers. For example, if a server is detected through REDFISH, the discovery and onboarding service 422 checks for an identifier in the Redfish discovery message indicating that the server is DCMHS compatible. If a server is a legacy system, the discovery and onboarding service 422 identifies that it does not have a DC-SCM 210. After scanning the network in the data center, the discovery and onboarding service 422 identifies the systems and creates an inventory in the hardware inventory database 424.

The hardware change detection component 426 monitors hardware modifications in the HPM 260 or the DC-SCM 210. Changes in the HPM 260 are advertised by the BMC 212. A change in the DC-SCM 210 is determined by detecting the HPM identifier or the system identifier of the server and mapping it with the DC-SCM identifier.

For example, initially a prior hardware implementation of the DC-SCM 210 (e.g., a first controller board) is installed in a particular modular hardware system 200. Accordingly, in the hardware inventory database 424, the identifier of the prior hardware implementation of the DC-SCM 210 is associated with identifier of the HPM 260 of the given modular hardware system 200. Subsequently, an updated hardware implementation of the DC-SCM 210 (e.g., a second controller board) replaces the prior hardware implementation. The identifier of the updated hardware implementation of the DC-SCM 210 is now associated with the HPM 260 of the given modular hardware system 200. That is, the DC-SCM identifier changes while the HPM or system identifier remains the same. Accordingly, the discovery and onboarding service 422 detects a DC-SCM change.

When a new or replacement DC-SCM 210 is installed in a given modular hardware system 200 (e.g., one of the DC-MHS servers 372-1 to 372-N), the BMC 320 on this DC-SCM 210 may come with a basic firmware that enables it to be discovered in the data center. However, this basic firmware may not have the necessary features and configurations required for the specific server environment. The BMC 320 needs to be flashed with new firmware that includes all the required feature sets to work in the environment.

The problem arises because the new/replacement DC-SCM 210 does not know the specific configuration needed for the server it is being installed in. Each BMC 320 has different platform configurations that it can manage, depending on the type of server and the components installed.

To address this issue, the build orchestrator 310 detects the new/replacement DC-SCM 210 and helps it get started with all the necessary firmware. This includes not only the BMC firmware, but also the BIOS firmware and the HROT firmware. The HROT firmware is important because it manages the security and integrity of the firmware on the BMC 320 and the BIOS. When there are new updates, the HROT firmware signatures and certificates also need to be updated to ensure the authenticity and integrity of the new firmware.

Similarly, the BIOS firmware needs to be updated because the new DC-SCM 210 does not know what kind of platform it is going to manage. The server could be an Intel system or an AMD system, and the BIOS SPI flash will change based on the specific Host Processor Module (HPM 260) installed in the server. The BIOS firmware needs to be updated to match the HPM 260 and the platform configuration.

The build orchestrator 310 uses the discovery service 312 to detect the new DC-SCM 210 and determine the specific platform configuration needed. The discovery service 312 can use protocols like REDFISH or IPMI to understand the characteristics of the server and create an inventory in the hardware inventory database 424.

In the modular hardware system 200, in certain scenarios, both the HPM 260 and the DC-SCM 210 need to be updated simultaneously. In these scenarios, the build orchestrator 310 treats the modular hardware system 200 as an entirely new system. This is because the identifiers for both the HPM 260 and the DC-SCM 210 in the updated hardware will not match any existing entries in the hardware inventory database 424.

In this scenario, the discovery and onboarding service 422 detects the new hardware components and flags the modular hardware system 200 as a new system in the hardware inventory database 424. Even though the chassis and other physical components of the modular hardware system 200 may remain the same, the change in both the HPM 260 and the DC-SCM 210 necessitates a complete system update.

To handle this situation, the firmware processing component 428 initiates a process to update all the firmware components from scratch. This involves generating new firmware images for the BIOS firmware module 352, the BMC firmware module 354, and the HROT firmware module 356 using the devops pipeline 362.

The firmware deployment manager 430 then deploys these new firmware images to the modular hardware system 200. All the components may be updated with the new HPM 260 and DC-SCM 210 hardware.

Further, when a hardware change is detected, the firmware processing component 428 inquires about the firmware versions on the new hardware. If the new hardware has older firmware or a different SOC (e.g., transitioning from Aspeed to Nuvoton), the firmware processing component 428 constructs a firmware image that contain modules corresponding to the changed components. For example, if the BIOS and BMC firmware need to be changed but not the HROT firmware, the firmware processing component 428 creates an image with the BIOS firmware module 352 and the BMC firmware module 354, and further marks the HROT firmware module 356 as having no payload available. Upon receiving the firmware image, the BMC 212/320 parses the payload and flashes the individual components.

The firmware deployment manager 430 manages the deployment of the firmware images created by the firmware processing component 428 to the DC-MHS servers 372-1 to 372-N. The process can be triggered either manually or automatically based on the configuration in the build orchestrator cloud 364.

Figure 5:
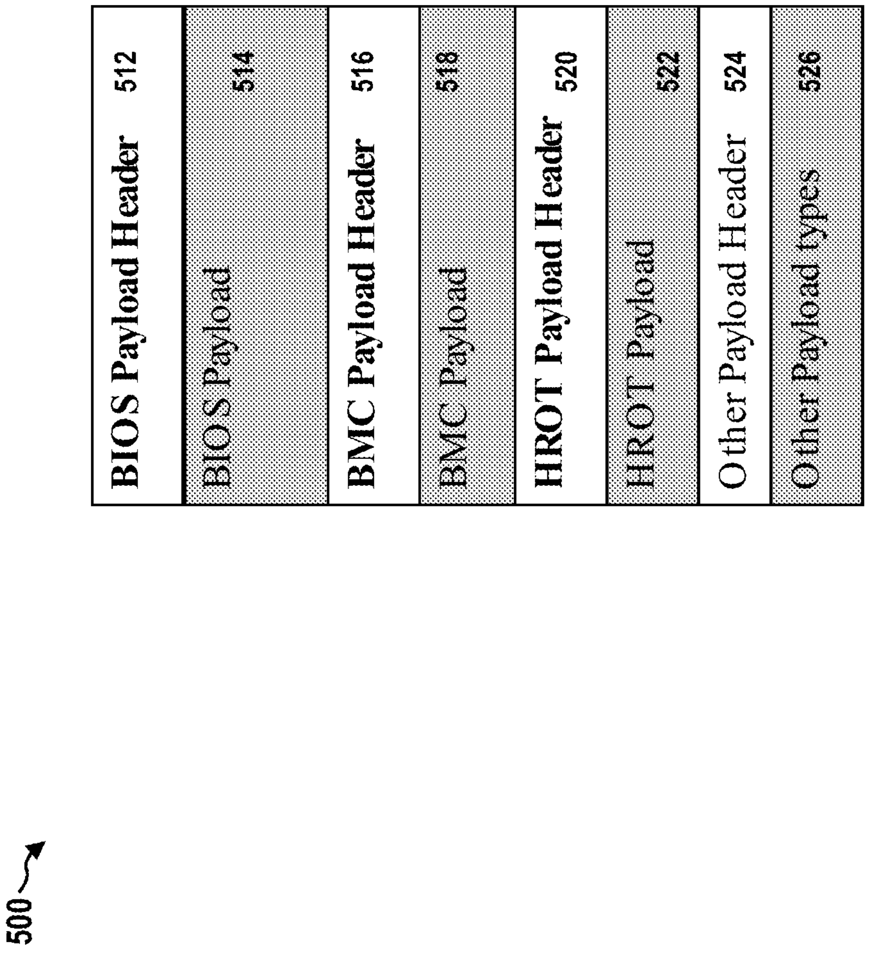
FIG. 5 is a diagram illustrating a structure of a firmware image.

FIG. 5 is a diagram illustrating a structure of a firmware image 500. The firmware image 500 is a consolidated firmware package that includes various firmware modules of the DC-SCM 210, such as the BIOS firmware module 352, the BMC firmware module 354, and the HROT firmware module 356.

The firmware image 500 contains a series of payload headers and payloads. Each payload header contains information about the corresponding payload, such as the component type, version information, payload size, and flash offsets. The flash offsets specify the location where the payload should be written in the firmware memory of the corresponding component.

More specifically, in this example, the firmware image 500 contains a BIOS payload header 512 followed by a BIOS payload 514. The BIOS payload header 512 contains information about the BIOS payload 514, such as the component type, version information, payload size, and flash offsets, if any. The BIOS payload 514 is the actual BIOS firmware module that will be flashed to update the BIOS on the DC-SCM 210.

Similarly, the firmware image 500 includes a BMC payload header 516 followed by a BMC payload 518. The BMC payload header 516 contains information about the BMC payload 518, and the BMC payload 518 is the actual BMC firmware that will be used to update the BMC 212/320 of the DC-SCM 210.

The firmware image 500 also includes an HROT payload header 520 followed by an HROT payload 522. The HROT payload header 520 contains information about the HROT payload 522, and the HROT payload 522 is the actual HROT firmware that will be used to update the HROT 216 of the DC-SCM 210.

Additionally, the firmware image 500 can include other payload headers 524 followed by their corresponding payloads 526. These optional payloads can be firmware for other components of the modular hardware system 200, such as a CPLD, GPU, storage device, or NIC.

When the BMC 212/320 receives the firmware image 500, it parses the image to extract and process the individual firmware components. The BMC starts by reading the first payload header, which in this example is the BIOS payload header. The BIOS payload header provides the offset and size of the BIOS payload within the firmware image 500.

The BMC 212/320 then reads the BIOS payload starting from the specified offset and continuing for the size indicated in the BIOS payload header. For example, if the BIOS payload header indicates an offset of 0 and a size of N bytes, the BMC 212/320 will read the BIOS payload from offset 0 to offset N within the firmware image 500.

After processing the BIOS payload, the BMC 212/320 moves on to the next payload header, which is the BMC payload header in this example. The BMC payload header provides the offset and size of the BMC payload. The BMC 212/320 reads the BMC payload starting from the specified offset and continuing until the end offset calculated based on the payload size.

The BMC 212/320 continues this process for each subsequent payload header and payload in the firmware image 500, such as the HROT payload header and HROT payload, and any additional payloads present.

By using this structured format with payload headers and payloads, the firmware image 500 enables the BMC 212/320 to efficiently parse and extract the individual firmware components. The BMC 212/320 can then flash or update the corresponding firmware memories of the BIOS, BMC itself, HROT, and other components based on the extracted payloads.

As described supra, the firmware processing component 428 of the build orchestrator 310 is responsible for constructing the firmware image 500. The firmware deployment manager 430 then deploys the firmware image 500 to the BMC 212/320 in the DC-SCM 210 of the DC-MHS servers 372-1 to 372-N. Upon receiving the firmware image 500, the BMC 212/320 parses the headers, extracts the relevant payloads, and flashes the firmware updates to the appropriate components.

In one scenario, a new or replacement the DC-SCM 210 is installed in the modular hardware system 200. The BMC 320 of this DC-SCM 210 initially has only a basic firmware that does not understand the format of the consolidated firmware image 500. In this scenario, the build orchestrator 310 may provide a mechanism to handle the issues.

More specifically, when the build orchestrator 310 pushes the consolidated firmware image 500 to the BMC 320, the BMC 320 will not understand the format and will throw back an error. To address this, the build orchestrator 310 first extracts the BMC firmware module 354 from the consolidated firmware image 500. This BMC firmware module 354 is in a format that the BMC 320 with the basic firmware can understand and flash.

The build orchestrator 310 then sends this extracted BMC firmware module 354 to the BMC 320. The BMC 320 flashes this firmware, which includes a new flasher capable of handling the consolidated firmware image 500 format.

After updating the BMC 320 with the new firmware, the build orchestrator 310 sends the full consolidated firmware image 500 again. However, this time, the BMC firmware module 354 within the consolidated image is marked as blank or empty, since the BMC 320 has already been updated. The consolidated firmware image 500 now includes the BIOS firmware module 352, the HROT firmware module 356, and any other necessary components like a CPLD firmware module. The updated BMC 320 can now parse this consolidated firmware image 500, extract the individual firmware modules, and flash them to the appropriate components.

In an alternative scenario, the consolidated firmware image 500 format may be the default format for updating the DC-SCM 210 firmware. In this case, even the base firmware of the BMC 320 would understand this format natively. The format can be a standard schema-based format for DC-SCM firmware updates.

Figure 6:
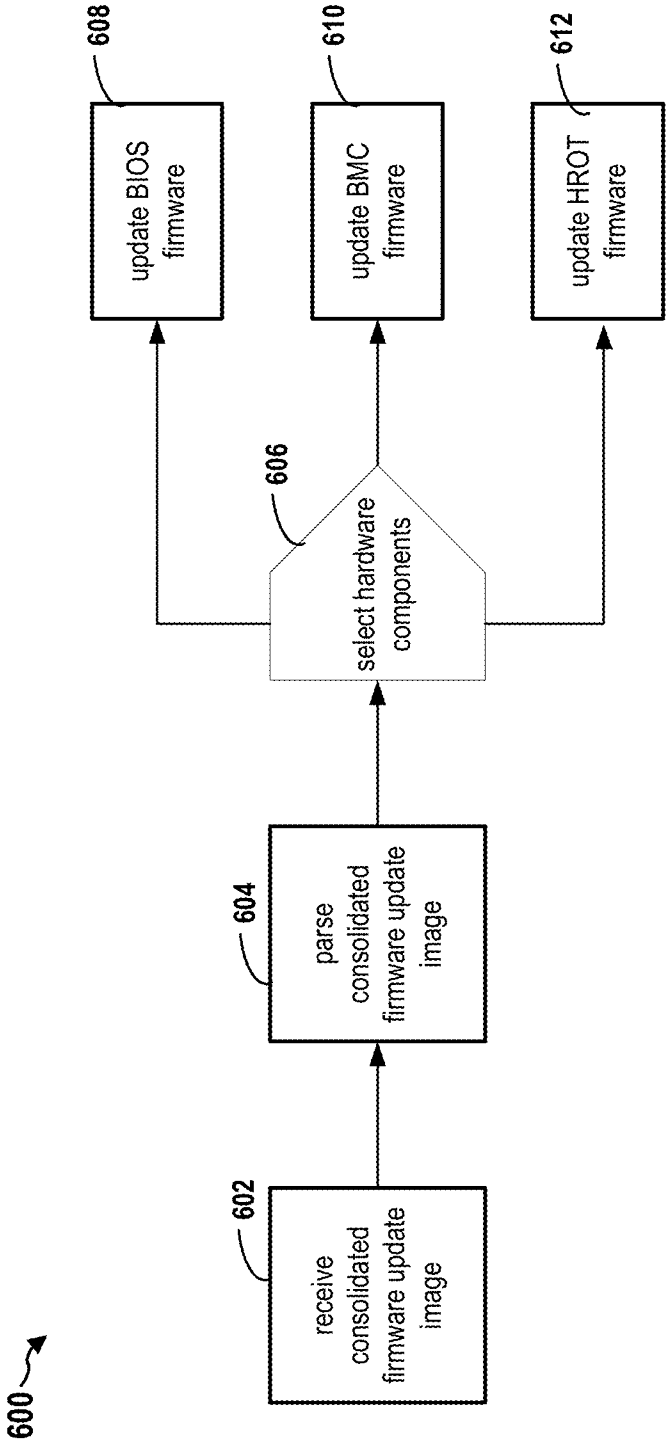
FIG. 6 is a flow chart illustrating a method for updating firmware.

FIG. 6 is a flow chart 600 illustrating a method for updating firmware performed by the BMC 212/320. In operation 602, the BMC 212/320 receives a consolidated firmware update image from the build orchestrator 310. This consolidated firmware update image, such as the firmware image 500, contains firmware modules for various components of the DC-SCM 210, including the BIOS firmware module 352, the BMC firmware module 354, and the HROT firmware module 356.

In operation 604, the BMC 212/320 parses the consolidated firmware update image. It reads the payload headers, such as the BIOS payload header 512, the BMC payload header 516, and the HROT payload header 520, to determine the offsets and sizes of the corresponding firmware payloads.

In operation 606, the BMC 212/320 selects the hardware components to be updated based on the parsed information from the payload headers. It identifies which components have new firmware available in the consolidated firmware update image.

In operation 608, the BMC 212/320 may update the BIOS firmware by extracting the BIOS payload 514 from the firmware image 500 using the offset and size information from the BIOS payload header 512. It then flashes the BIOS firmware with the extracted BIOS payload.

In operation 610, the BMC 212/320 may update its own BMC firmware. It extracts the BMC payload 518 using the information from the BMC payload header 516 and flashes the BMC firmware with the extracted payload. This step is skipped if the BMC firmware has already been updated to a version compatible with the consolidated firmware update image format.

In operation 612, the BMC 212/320 may update the HROT firmware. It extracts the HROT payload 522 based on the HROT payload header 520 and flashes the HROT firmware with the extracted payload.

The BMC 212/320 may perform additional operations (not shown) to update other firmware components included in the consolidated firmware update image, such as CPLD, GPU, storage, or NIC firmware, by extracting their respective payloads using the corresponding payload headers.

By following this process, the BMC 212/320 can efficiently update multiple firmware components of the DC-SCM 210 using a single consolidated firmware update image received from the build orchestrator 310. This streamlines the firmware update process in the modular hardware system 200 and ensures that all necessary firmware components are updated in a coordinated manner.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of updating firmware by a baseboard management controller (BMC), comprising:

receiving, by the BMC, a consolidated firmware update image containing a plurality of firmware modules for a corresponding plurality of different hardware components of a data center secure control module (DC-SCM), the plurality of different hardware components comprising at least two of a basic input/output system (BIOS), the BMC, and a hardware root of trust (HROT);

parsing, by the BMC, the consolidated firmware update image to identify the plurality of firmware modules, the parsing comprising reading, for each firmware module of the plurality of firmware modules, a corresponding header that indicates a component type, a version, a payload size, and a flash offset for a payload containing the firmware module;

selecting, by the BMC, a set of the plurality of different hardware components to be updated based on the parsing of the consolidated firmware update image; and updating, by the BMC, firmware of the selected set of hardware components using the corresponding firmware modules from the consolidated firmware update image, the updating comprising, for each hardware component of the selected set, extracting the corresponding firmware module from the consolidated firmware update image based on the flash offset and the payload size indicated by the corresponding header, and flashing the firmware of the hardware component with the extracted corresponding firmware module.

2. The method of claim 1, wherein the plurality of firmware modules include at least one of a basic input/output system (BIOS) firmware module, a BMC firmware module, and a hardware root of trust (HROT) firmware module.

3. The method of claim 1, wherein the parsing the consolidated firmware update image comprises reading a header for each of the plurality of firmware modules to determine an offset and a size for a corresponding payload containing the each firmware module.

4. The method of claim 3, wherein the header contains information about the corresponding payload, the information including at least one of a component type, a version, a payload size, and a flash offset.

5. The method of claim 3, wherein the updating the firmware of the selected set of hardware components comprises:

extracting, for each of the selected set of hardware components, a corresponding firmware module from the consolidated firmware update image based on the offset and the size determined from the header of the corresponding firmware module; and flashing the firmware of the each hardware component with the extracted corresponding firmware module.

6. The method of claim 1, wherein the consolidated firmware update image is received from a build orchestrator in response to the build orchestrator detecting a change in a hardware component of the DC-SCM.

7. The method of claim 1, wherein the consolidated firmware update image has a firmware module marked as blank.

8. The method of claim 1, further comprising:

prior to receiving the consolidated firmware update image:

receiving, by the BMC, a BMC firmware image containing a BMC firmware module; and flashing, by the BMC, the received BMC firmware module to update the BMC firmware to support the consolidated firmware update image, wherein the BMC firmware module in the consolidated firmware update image is marked as blank.

9. A method of updating firmware by a build orchestrator, comprising:

detecting, by the build orchestrator, a change in a hardware component of a data center secure control module (DC-SCM) in a modular hardware system, wherein the change in the hardware component comprises at least one of a change in a host processor module (HPM) of the modular hardware system, wherein the change in the HPM is detected based on a notification from a baseboard management controller (BMC) of the DC-SCM, and a change in the BMC of the DC-SCM, wherein the change in the BMC is detected based on a mismatch between an identifier of the BMC and a stored identifier of the BMC in a hardware inventory database;

constructing, by the build orchestrator, a consolidated firmware update image containing one a plurality of firmware modules for a corresponding plurality of different hardware components of the DC-SCM based on the detected change, the plurality of different hardware components comprising at least two of a basic input/output system (BIOS), the BMC, and a hardware root of trust (HROT), and each firmware module of the plurality of firmware modules being associated with a header that indicates a component type, a version, a payload size, and a flash offset for a payload containing the firmware module; and deploying, by the build orchestrator, the consolidated firmware update image to the BMC of the DC-SCM.

10. The method of claim 9, wherein the plurality of firmware modules include at least one of a basic input/output system (BIOS) firmware module, a BMC firmware module, and a hardware root of trust (HROT) firmware module.

11. The method of claim 9, wherein the constructing the consolidated firmware update image comprises:

determining a set of hardware components to be updated based on the detected change;

retrieving, for each of the set of hardware components, a corresponding firmware module; and packaging the retrieved firmware modules into the consolidated firmware update image, wherein each firmware module is associated with a header containing information about the firmware module.

12. The method of claim 11, wherein the header contains information including at least one of a component type, a version, a payload size, and a flash offset.

13. The method of claim 9, wherein the detecting the change in the hardware component comprises:

maintaining a hardware inventory database containing identifiers of hardware components of the modular hardware system;

detecting a new identifier for the DC-SCM that is different from a stored identifier for the DC-SCM in the hardware inventory database; and determining that the DC-SCM has been changed based on the detecting the new identifier.

14. The method of claim 9, further comprising, prior to deploying the consolidated firmware update image:

in response to the detecting the change in the hardware component, determining whether the BMC of the DC-SCM supports the consolidated firmware update image;

in response to determining that the BMC does not support the consolidated firmware update image:

extracting a BMC firmware module from the consolidated firmware update image; and deploying the extracted BMC firmware module to the BMC to update a BMC firmware, and wherein the consolidated firmware update image is deployed to the BMC after updating the BMC firmware, wherein the BMC firmware module in the consolidated firmware update image is marked as blank.

15. The method of claim 9, wherein the constructing the consolidated firmware update image comprises:

retrieving a platform configuration for the modular hardware system from a configuration database; and constructing the consolidated firmware update image based on the retrieved platform configuration.

16. A baseboard management controller (BMC), comprising:

a processor; and a memory storing instructions that, when executed by the processor, cause the BMC to:

receive a consolidated firmware update image containing a plurality of firmware modules for a corresponding plurality of different hardware components of a data center secure control module (DC-SCM), the plurality of different hardware components comprising at least two of a basic input/output system (BIOS), the BMC, and a hardware root of trust (HROT);

parse the consolidated firmware update image to identify the plurality of firmware modules, wherein the instructions to parse comprise instructions to read, for each firmware module of the plurality of firmware modules, a corresponding header that indicates a component type, a version, a payload size, and a flash offset for a payload containing the firmware module;

select a set of the plurality of different hardware components to be updated based on the parsing of the consolidated firmware update image; and update firmware of the selected set of hardware components using the corresponding firmware modules from the consolidated firmware update image-, wherein the instructions to update comprise instructions to, for each hardware component of the selected set, extract the corresponding firmware module from the consolidated firmware update image based on the flash offset and the payload size indicated by the corresponding header, and flash the firmware of the hardware component with the extracted corresponding firmware module.

17. The BMC of claim 16, wherein the plurality of firmware modules include at least one of a basic input/output system (BIOS) firmware module, a BMC firmware module, and a hardware root of trust (HROT) firmware module.

18. The BMC of claim 16, wherein the instructions to parse the consolidated firmware update image include instructions to read a header for each of the plurality of firmware modules to determine an offset and a size for a corresponding payload containing the each firmware module.

19. The BMC of claim 18, wherein the header contains information about the corresponding payload, the information including at least one of a component type, a version, a payload size, and a flash offset.

* * * * *